Oct. 19, 1954   H. J. STRETTON   2,692,325
PORTABLE WELDING OR CUTTING MACHINE
Filed Jan. 14, 1952                              2 Sheets-Sheet 1

Inventor
H. J. Stretton
By Glascock & Downing Diebold
Attys.

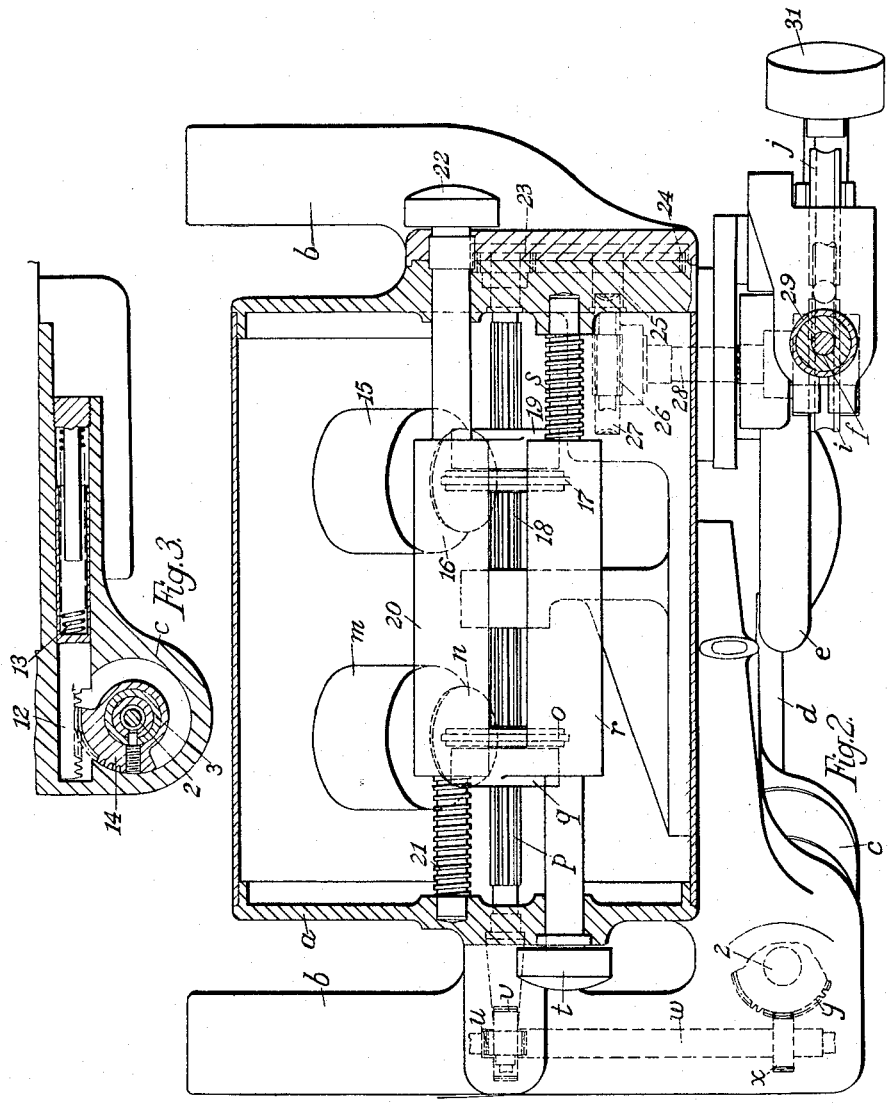

Patented Oct. 19, 1954

2,692,325

UNITED STATES PATENT OFFICE 2,692,325

PORTABLE WELDING OR CUTTING MACHINE

Henry Jackson Stretton, Barnt Green, England, assignor to Fusarc Limited, Gateshead-on-Tyne, England Application January 14, 1952, Serial No. 266,318

Claims priority, application Great Britain January 24, 1951

4 Claims. (Cl. 219—8)

1

This invention has for its object to provide in a simple form, a portable machine for effecting electric welding operations by means of a continuous electrode, or for effecting cutting operations by means of a flame.

The invention comprises the combination of a hollow body part adapted to be manipulated by the user, an electrode feed mechanism, or a flame nozzle, mounted on the body part, a castor for supporting the body part on the work piece, and variable-speed mechanism contained in the body part for rotating the castor.

In the accompanying drawings:

Figure 3 is a fragmentary sectional view on the line 3—3, Figure 1.

Figure 1:
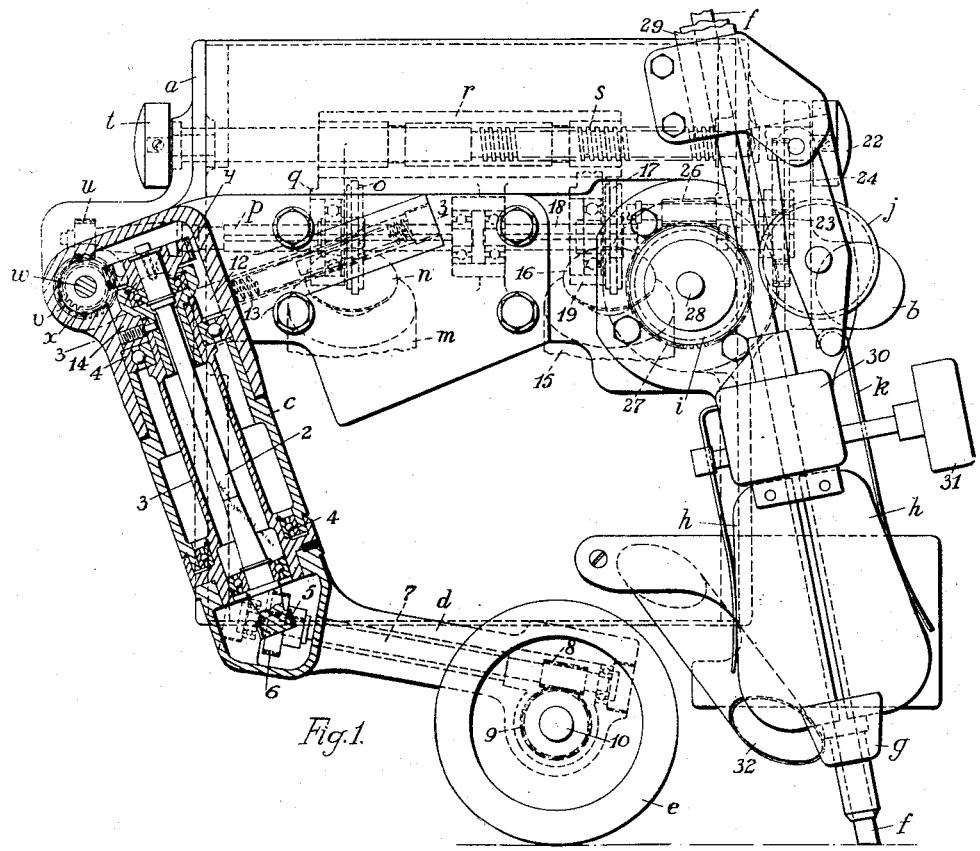
Figure 1 is a part sectional side elevation, and Figure 2 a part sectional plan of a welding machine embodying the invention.

Referring to the drawings, the machine there shown comprises a hollow body part $a$ having thereon one or a pair of handles $b$ for use by the operator. At one side of the body part is formed or secured a hollow extension $c$, hereinafter referred to as the bracket, the longitudinal axis of which is arranged at about 60° to the horizontal, and at the lower end of the bracket is swivelled a substantially horizontal arm $d$ carrying at its outer end a rubber-tyred propelling castor $e$, the latter being so located relatively to the body part as to reduce to a minimum the unbalanced weight to be supported by the operator and to be in contact with the work surface ahead of the electrode $f$.

Also on the same side of the body part as the bracket is mounted a guide nozzle $g$, and contacts $h$ for the electrode, and a pair of feed rollers $i, j$ one of which ($j$) is loaded by a spring $k$.

For actuating the castor $e$, there is provided in the body part an electric motor $m$ which drives a friction disc $n$, and in contact with the outer face of this disc is provided another friction disc $o$ which is slidable on a splined spindle $p$. The disc $o$ is rotatably supported on an arm $q$ extending from an internally screw threaded sleeve $r$ through which extends an adjusting screw $s$, the latter being operable by a knob $t$ for moving the disc $o$ relatively to the disc $n$, so enabling the speed of the spindle $p$ to be varied. The spindle $p$ has formed on or secured to it a helically toothed wheel $u$ engaging a complementary wheel $v$ on a spindle $w$, and on this spindle is formed or secured a helically toothed wheel $x$ engaging a complementary wheel $y$ on a spindle $2$ contained in the bracket $c$. The spindle $2$ is supported in a hollow stem $3$ formed on or secured to the arm $d$ and supported by bearings $4$ in the bracket, the stem $3$ serving to effect the desired swivel connection between the arm $d$ and bracket $c$.

On the lower end of the spindle $2$ is formed

2 or secured a helically toothed wheel $5$ engaging a complementary wheel $6$ on a spindle $7$ extending along the interior of the arm $d$, and on this spindle is formed or secured another helically toothed wheel $8$ engaging a complementary wheel $9$ on the castor spindle $10$.

To restore the arm $d$ and castor $e$ to their normal position relatively to the body part after lateral deflection of the arm $d$, the latter is loaded by the spring device shown in Figures 1 and 3. This device comprises a toothed rack $12$ loaded by a spring $13$ and engaging a toothed segment $14$ on the upper end of the hollow stem $3$.

Also there is provided in the body part $a$ a second electric motor $15$ for imparting a variable speed of rotation to the electrode feed roller $i$. The means for transmitting motion from this motor to the said feed roller is essentially similar to that above described for actuating the castor. With the motor $15$ is combined a friction disc $16$ with which co-operates another friction disc $17$. The latter is mounted on a splined spindle $18$, and is rotatably supported on an arm $19$ extending from an internally screw threaded sleeve $20$ through which passes a screw $21$ having at its outer end an actuating knob $22$. The spindle $18$ has formed on or secured to it a toothed wheel $23$ engaging a complementary wheel $24$ on a spindle $25$, and on this spindle is formed or secured a helically toothed wheel $26$ engaging a complementary wheel $27$ on a spindle $28$ carrying the feed roller $i$.

The continuous electrode $f$ is supplied from a reel which can be carried on a floor trolley or an overhead gantry or otherwise, and is led to the contacts $h$ and feed guide $g$ through a hollow cable $29$ which conveys current to the electrode. The pressure exerted by the contact $h$ on the electrode is adjustable by any convenient screw or other mechanism contained in the part $30$ and operable by a knob $31$.

Alternatively, both the castor $e$ and the feed roller $i$ may both be driven by a single electric motor instead of by separate motors as above described. In combination with the single motor may be arranged a single driving friction disc of sufficiently large diameter to enable it to drive both of the driven discs $o$, $17$. Or a single motor may be employed to drive two driving discs as $u$, $16$ these being interconnected by any appropriate gearing.

If desired an air blower may be arranged within the body part $a$ for directing a stream of air through a duct $32$ on to the electrode $f$ and thereby deflecting or dispensing the fumes produced in the welding operation. The blower may conveniently be driven by the electric motor (when a single motor is used) or by one of the motors $m$, $15$.

The machine above described is especially useful for effecting welding operations on the abutting edges of metal plates disposed in the same plane, or at right (or other) angles to each other or for welding rolled or fabricated metal sections. When in use, the machine is supported by the castor which rolls along and in contact with the work in advance of the electrode at the desired rate, and is guided by the operator. At the same time, the electrode is automatically fed to the work at the appropriate rate. By mounting the castor in the manner above described, the relative disposition of the plane of the castor and the axis of the electrode can be varied through a range extending from a condition in which the axis of the electrode is in the same plane as the castor to one in which the said axis is inclined at about 45° to the plane of the castor.

The invention is also applicable in essentially the same manner to an oxy-acetylene or other flame cutting machine, the electrode nozzle and feed mechanism being replaced by a gas nozzle and any convenient gas controlling means. Also the electric motor or motors above described may be substituted by a flexible shaft or shafts driven from any convenient external source of motion.

By this invention, a portable electric welding or a flame cutting machine can be provided in a very convenient form which can be easily manipulated by the user, and which is adapted for dealing with a large variety of work.

Having thus described my invention what I claim as new and desire to secure by Letters Patent is:

1. A portable machine for use in effecting welding or flame cutting operations on work pieces, comprising in combination a hollow body part having at least one handle through the medium of which the body part is manipulatable by the user, a hollow extension on said body part, a substantially horizontal arm connected at one end to said hollow extension, and carrying at the other end a castor by which said body part can be supported on the work pieces, and by the rotation of which the body part is movable along the work pieces, a variable-speed driving mechanism contained in the body part, transmission means interconnecting the driving mechanism and the castor, means in the body part for directing a work-performing medium on to the work pieces, and a swivel connection between said arm and said hollow extension, whereby the plane of the castor may be varied with respect to the axis of the work-performing medium 2. A portable machine for use in effecting welding or flame cutting operations on work-pieces, comprising in combination a hollow body part having at least one handle through the medium of which the body part is manipulatable by the user, a hollow bracket on one side of said body part and having its longitudinal axis inclined at about 60° to the horizontal, a substantially horizontal arm connected at one end to said hollow bracket, and carrying at the other end a single castor by which the body part can be supported on the work-pieces, and by the rotation of which the body part is movable along the work-pieces, a variable speed driving mechanism, contained in the body part, transmission means interconnecting the driving mechanism and the castor, means in the body part for directing a work-performing medium on to the work pieces, a swivel connection between said arm and said hollow bracket whereby the arm may be laterally deflected, and spring means in said body part for restoring said arm to its normal position.

3. A portable machine for use in effecting welding or flame-cutting operations on work pieces, comprising in combination a hollow body part having at least one handle through the medium of which the body part is manipulatable by the user, a hollow bracket mounted on one side of said body part and having its longitudinal axis inclined at about 60° to the horizontal, a hollow stem rotatably supported within said hollow bracket, a substantially horizontal arm of hollow form connected at one end to said rotatable hollow stem, and carrying at the other end a single castor by which the body part can be supported on the work-pieces, and by the rotation of which the body part is movable along the work pieces, a variable speed driving mechanism contained in the body part, transmission means disposed in said bracket and said arm for interconnecting the driving mechanism and the castor, means in the body part for directing a work-performing medium on to the work pieces, and spring means operatively associated with said rotatable hollow stem for retaining said arm in the normal position.

4. A portable machine for use in effecting welding or flame-cutting operations on work-pieces comprising in combination, a hollow body part having at least one handle through the medium of which the body part is manipulatable by the user, a hollow extension on said body part, a substantially horizontal arm connected at one end to said hollow extension, and carrying at the other end a single castor by which said body part can be supported on the work pieces, and by the rotation of which the body part is movable along the work pieces, a variable speed driving mechanism contained in said body part and comprising a driving disc, a driven disc in frictional contact with the face of said driving disc, a splined shaft on which the driven disc is slidably mounted, an internally screw-threaded sleeve on which the driven disc is rotatably mounted, and a manually operable screw passing through the sleeve for effecting relative adjustment of the driving and driven discs, transmission means disposed in said hollow extension and in said arm for interconnecting the driving mechanism and the castor, means in the body part for directing a work-performing medium on to the work pieces, a swivel connection between said arm and said hollow extension whereby the arm may be swung laterally, and spring means in said body part operatively associated with said swivel connection for restoring said arm to its normal position.

References Cited in the file of this patent

UNITED STATES PATENTS

| Number | Name | Date |
|---|---|---|
| 1,029,389 | Metzger | June 11, 1912 |
| 1,644,896 | Busekist | Oct. 11, 1927 |
| 1,731,502 | Paterson | Oct. 15, 1929 |
| 1,901,466 | Osborne | Mar. 14, 1933 |
| 1,978,042 | Dodge | Oct. 23, 1934 |
| 2,163,657 | Beckman | June 27, 1939 |

FOREIGN PATENTS

| Number | Country | Date |
|---|---|---|
| 147,554 | Great Britain | Oct. 3, 1921 |
| 714,709 | France | Sept. 14, 1931 |